United States Patent
Baharav et al.

(10) Patent No.: US 6,737,625 B2
(45) Date of Patent: May 18, 2004

(54) BAD PIXEL DETECTION AND CORRECTION IN AN IMAGE SENSING DEVICE

(75) Inventors: Izhak Baharav, San Jose, CA (US); Ramakrishna Kakarala, Sunnyvale, CA (US); Xuemei Zhang, Mountain View, CA (US); Dietrich Werner Vook, Menlo Park, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/895,627

(22) Filed: Jun. 28, 2001

(65) Prior Publication Data

US 2003/0001078 A1 Jan. 2, 2003

(51) Int. Cl.[7] ............................................... H04N 5/335
(52) U.S. Cl. ................... 250/208.1; 348/230.1; 348/615
(58) Field of Search .................. 250/208.1; 348/246, 348/247, 615, 222, 230, 231, 230.1

(56) References Cited

U.S. PATENT DOCUMENTS

| 4,237,488 A | * | 12/1980 | Takemura ................... 358/163 |
|---|---|---|---|
| 4,253,120 A | * | 2/1981 | Levine ........................ 358/213 |
| 4,701,784 A | | 10/1987 | Matsuoka et al. ..... 358/213.17 |
| 4,734,774 A | | 3/1988 | Skaggs et al. ......... 358/213.15 |
| 4,739,495 A | * | 4/1988 | Levine ........................ 364/571 |
| 4,920,428 A | | 4/1990 | Lin et al. .................... 358/461 |
| 5,047,863 A | | 9/1991 | Pape et al. ............. 358/213.16 |
| 5,185,883 A | * | 2/1993 | Ianni et al. .................. 348/247 |
| 5,204,761 A | | 4/1993 | Gusmano .................... 358/461 |
| 5,272,536 A | * | 12/1993 | Sudo et al. ............ 358/213.15 |
| 5,392,070 A | | 2/1995 | Endo et al. .................. 348/247 |
| 5,499,114 A | | 3/1996 | Compton .................... 358/483 |
| 5,657,400 A | | 8/1997 | Granfors et al. ............ 382/254 |
| 6,118,846 A | | 9/2000 | Liu ............................. 378/62 |

FOREIGN PATENT DOCUMENTS

| EP | 1003332 A2 | 10/1999 |
|---|---|---|
| EP | 1045578 A2 | 3/2000 |

OTHER PUBLICATIONS

EPA transmittal letter dated Nov. 4, 2003.

* cited by examiner

*Primary Examiner*—Stephone B. Allen (57) ABSTRACT

A sensor includes an array of photodetectors each generating an output signal of pixel data indicative of incident light intensity. This pixel data is read out from the array one line at a time and stored in a line buffer. A bad pixel processor includes a first buffer that stores pixel data obtained from the line buffer for a certain pixel in a currently read out line and pixel signal light data for pixels adjacent to the certain pixel.

24 Claims, 5 Drawing Sheets

BAD PIXEL DETECTION AND CORRECTION IN AN IMAGE SENSING DEVICE

BACKGROUND OF THE INVENTION

1. Technical Field of the Invention

The present invention relates to an image sensing device comprising an arrayed plurality of photodetectors and, in particular, to the detection of bad pixels in such a device and the correction of pixel data output from those bad pixels.

2. Description of Related Art

It is well known in the art to assemble a plurality of photodetectors (also referred to in the art as "photosites") in an array format to create an image sensing device. Each individual photodetector operates to output a signal whose magnitude is proportional to the intensity of light incident on the site of the photodetector. These output signals can then be subsequently processed and manipulated to generate an image comprised of a plurality of individual picture elements (also referred to in the art as "pixels"), wherein each pixel in the image corresponds with one of the photodetectors.

The individual photodetectors used in such a sensing device are typically photodiodes that are formed on a semiconductor substrate or chip. The array of these photodetectors may include thousands (if not hundreds of thousands or millions) of individual photodetectors. Even with a semiconductor manufacturing process having a 99% yield, it is recognized that the sensing device array will inevitably include a number of bad photodetectors (also referred to herein as "bad pixels"). Requiring a semiconductor production line to produce sensors without any bad pixels is a very stringent and perhaps an economically unfeasible and unrealizable demand. It is accordingly accepted for sensors to include some bad pixels as long as a suitable mechanism is available to detect the bad pixels and satisfactorily correct the photodetector output signals. These detection/correction mechanisms generally comprise hardware or software processes that detect bad pixels based on their output signals and alter/replace their output signals to more accurately reflect the intensity of the light incident on the photodetector.

A bad pixel within a sensor may arise in a number of ways. First, the signal output from the photodetector may always give a high reading (a "hot pixel"). This defect produces a brighter than expected spot in the generated image. Second, the signal output from the photodetector may always give a low reading (a "dead pixel"). This defect produces a darker that expected spot in the generated image. Third, a signal proportional to the incident light may be generated, but (due, for example, to incorrect photodiode gain, dark current and/or offset) does not accurately represent of the incident light in the sense that it differs from signals generated by other similarly situated photodetectors (a "noisy pixel"). This defect produces an erroneous spot (color, intensity, contrast, and the like) in the generated image.

Figures 1, 2:
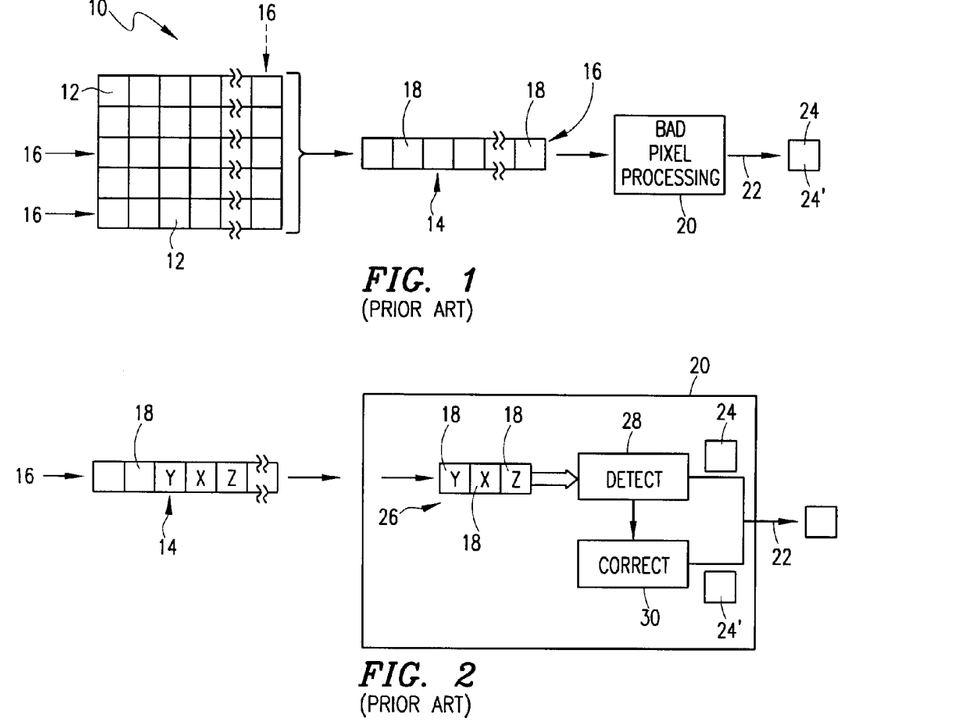
FIG. 1, previously described, is a simplified schematic diagram of a sensor read-out operation in accordance with the prior art.
FIG. 2, previously described, is a block diagram illustrating one known operation for bad pixel processing.

FIG. 1 shows a simplified schematic diagram of a sensor read-out operation in accordance with the prior art. A sensor array 10 includes a plurality of photodetectors 12. Each photodetector 12 outputs a signal (referred to herein as "pixel data") whose magnitude ideally has a predetermined monotonic relationship to the intensity of light incident on the photodetector. Although not explicitly shown, the generated signal for each pixel has a digital format (obtained through appropriate analog-to-digital conversion) normally ten to twelve bits in size.

A read-out buffer 14 is used to read out and capture either a horizontal row or vertical column of individual pixel data that is generated from the photodetectors. In this context, a horizontal row or a vertical column is referred to as a "line" 16. Following capture of a line 16 of pixel data in the buffer 14, each individual piece of pixel data 18 is processed by a bad pixel processor 20. The processor 20 operates to serially examine each piece of pixel data 18 in a line 16, detect instances where that piece of data has been output by a bad pixel, and in such cases effectuate a correction on the pixel data so that it more accurately represents the intensity of the light that is incident on the photodetector. Pixel data is then serially output 22 by the processor 20 for each pixel in either its original form 24 (i.e., as read out by the buffer 14) or a modified form 24' (i.e., as corrected when a bad pixel is detected).

FIG. 2 shows a block diagram illustrating one known operation for bad pixel processing performed by processor 20 of FIG. 1. The bad pixel processor 20 serially processes the pixel data 18 captured by the buffer 14 for one line 16 (see, FIG. 1) one pixel at a time (generically referred to as pixel "X") in order to determine if each piece of the pixel data under examination is generated by a bad pixel. To assist in the making of this determination, the mechanism includes a data buffer 26 that stores the pixel data 18 (as captured in buffer 14) for not only the pixel X under examination, but also for the pixels Y and Z that neighbor (e.g., are immediately adjacent to) the pixel X in the same read-out line 16.

A detection algorithm 28 processes the pixel data 18 for pixels X, Y and Z and determines if the pixel data for pixel X differs from the pixel data for pixels Y and Z (either individually, by median or on average) by a deviation that exceeds a certain threshold. If not, the pixel data 18 for pixel X is assumed to represent valid pixel data generated from a good pixel, and is serially output 22 in its original form 24. If there is an excessive deviation (beyond the threshold), the pixel data 18 for pixel X is assumed to be generated from a bad pixel, and a correction algorithm 30 is executed to modify the pixel data to produce modified pixel data 24' that attempts to more accurately represent the intensity of the light that is incident on the photodetector. As an example, the correction algorithm may replace the pixel data 18 for pixel X with pixel data 24' comprising the median or average value of the pixel data 18 for the adjacent pixels Y and Z on the same line 16. As another example, the correction algorithm may replace the pixel data 18 for pixel X with pixel data 24' comprising the pixel data 18 for either one of the adjacent pixels Y or Z on the same line 16. Numerous other operations for correcting pixel data from bad pixel are known in the art. Following correction, the modified data 24' for pixel X is passed to serial output 22.

Figure 3:
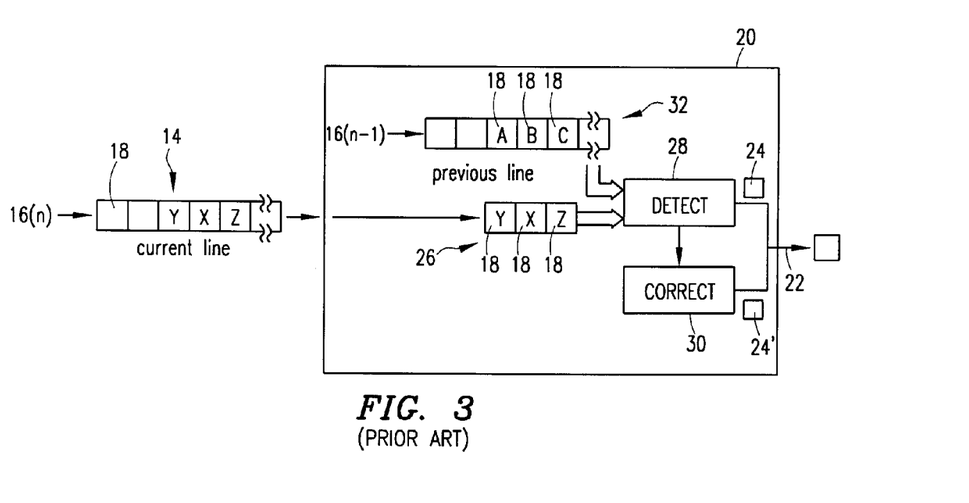
FIG. 3, previously described, is a block diagram illustrating one known operation for bad pixel processing.

FIG. 3 shows a block diagram illustrating another known operation for bad pixel processing performed by the processor 20 of FIG. 1. The bad pixel processor 20 serially processes the pixel data 18 captured by the buffer 14 for one line 16 (see, FIG. 1) one pixel at a time (generically referred to as pixel "X") in order to determine if any of the pixel data under examination is generated by a bad pixel. To assist in the making of this determination, the processor 20 includes a data buffer 26 that stores the pixel data 18 (as currently captured in buffer 14) for not only the pixel X under examination, but also for the pixels Y and Z that neighbor (e.g., are immediately adjacent to) the pixel X in the currently read-out line 16(n). To farther assist in the making of this determination, the processor 20 includes a data buffer 32 storing the pixel data 18 that was previously captured in buffer 14 for an adjacent, previously read-out line 16(n−1).

More specifically, the pixel data 18 of interest comprises that pixel data for pixels A, B and C that most closely neighbor pixel X in the previously read-out line 16(n–1).

A detection algorithm 28 processes the pixel data 18 for pixels A, B, C, X, Y and Z and determines if the pixel data for pixel X differs from the pixel data for pixels A, B, C, Y and Z (either individually, in pairs or groups, by median or on average) by a deviation that exceeds a certain threshold. If not, the pixel data 18 for pixel X is assumed to represent valid pixel data generated from a good pixel, and is serially output 22 in its original form 24. If there is an excessive deviation (beyond the threshold), the pixel data 18 for pixel X is assumed to be generated by a bad pixel, and a correction algorithm 30 is executed to modify the pixel data to generate modified pixel data 24' that more accurately represents the intensity of the light that is incident on the photodetector. Again, as discussed above, any of the known operations for correcting bad pixel signal light data may be used, and beneficially pixel data from additional pixels (e.g., pixels A, B and C) may be evaluated during this correction. Following correction, the modified pixel data 24' for pixel X is passed to serial output 22.

The bad pixel processing operation of FIG. 3 considers more pixel data 18 than the operation of FIG. 2 for purposes of both detecting bad pixels (see, operation 28) and correcting/modifying the pixel data for the detected bad pixels (see, operation 30). However, the operation illustrated in FIG. 3 has a significant memory overhead requirement. For example, consider an array 10 that generates for each photodetector 12 digitized pixel data 18 that is ten to twelve bits in magnitude, and wherein each line 16 includes one-thousand photodetectors (such as would be the case, for example, with a one mega-pixel sensor array). The bad pixel processor 20 would accordingly require, for the implementation shown in FIG. 3, a buffer 32 memory capable of storing 10–12 kbits of data in addition to the memory required for the buffer 26.

It is recognized that the array 10 along with the line read-out buffer 14 and the bad pixel processor 20 can be implemented on a single integrated circuit chip (i.e., the same semiconductor substrate). This is possible using, for example, CMOS fabrication techniques that allow for such an integration of components and functionalities. At the same time, however, even given the miniaturization capable through integrated circuit fabrication, the array 10 itself along with the associated circuitry (for example, the A/D conversion circuit, the line read-out buffer 14, the detector 28 and the corrector 30) take up a significant amount of semiconductor area, and there would be an advantage for many applications of the sensor if the memory requirements of at least the previous line 16(n–1) buffer 32 could be minimized.

SUMMARY OF THE INVENTION

The invention provides a sensor that comprises a plurality of photodetectors arranged in a sensor array. Each photodetector generates an output signal of pixel data that is indicative of incident light intensity. This pixel data is read out from the array one line at a time and stored in a line buffer. The invention further includes a bad pixel processor that includes a first buffer storing pixel data obtained from the line buffer for a certain pixel in a currently read out line and pixel data for pixels adjacent to the certain pixel. A second buffer included in the processor stores characteristic features for each of the pixels in a line read out from the array previous to the currently read out line. The pixel data stored in the first buffer and the characteristic features stored in the second buffer are then processed to identify whether the certain pixel in the currently read out line is a bad pixel.

In one embodiment, processing tar bad pixel detection includes an operation that precludes any finding of the certain pixel as being a bad pixel if a characteristic feature in the second buffer indicates that a pixel in the previous line that is adjacent to the certain pixel in the current line was identified as a bad pixel.

In another embodiment, processing for bad pixel detection includes an operation that applies a variable detection threshold against the certain pixel, with the value of the threshold being set higher if the characteristic features stored in the second buffer indicate that a pixel in the previous line that is adjacent to the certain pixel in the current line was identified as a bad pixel.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE EXEMPLARY EMBODIMENTS OF THE INVENTION

Figure 4:
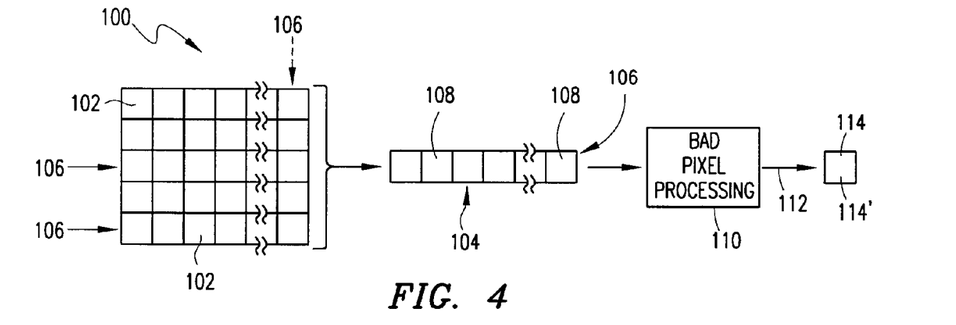
FIG. 4 is a simplified schematic diagram of a sensor read-out operation in accordance with an embodiment of the present invention.

FIG. 4 shows a simplified schematic diagram of a sensor read-out operation in accordance with an embodiment of the present invention. A sensor array 100 includes a plurality of photodetectors 102. Each photodetector 102 outputs a signal (referred to herein as "pixel data") whose magnitude ideally has a predetermined monotonic relationship to the intensity of light incident on the photodetector. Although not explicitly shown, the generated signal for each pixel has a digital format (obtained through appropriate analog-to-digital conversion) normally ten to twelve bits in size.

A read-out buffer 104 is used to read out and capture either a horizontal row or vertical column of individual pixel data that is generated from the photodetectors. In this context, a horizontal row or a vertical column is referred to as a "line" 106. Following capture of a line 106 of pixel data in the buffer 104, each individual piece of pixel data 108 is serially processed in a bad pixel processor 110. The processor 110 operates to examine each piece of pixel data 108, detect instances where that piece of pixel data has been output by a bad pixel, and in such cases effectuate a correction on the pixel data so that it more accurately represents the intensity of the light that is incident on the photodetector. Pixel data is then serially output 112 by the processor 110 for each pixel in either its original form 114 (i.e., as read out by the buffer 104) or a modified form 114' (i.e., as corrected when a bad pixel is detected).

Figure 5:
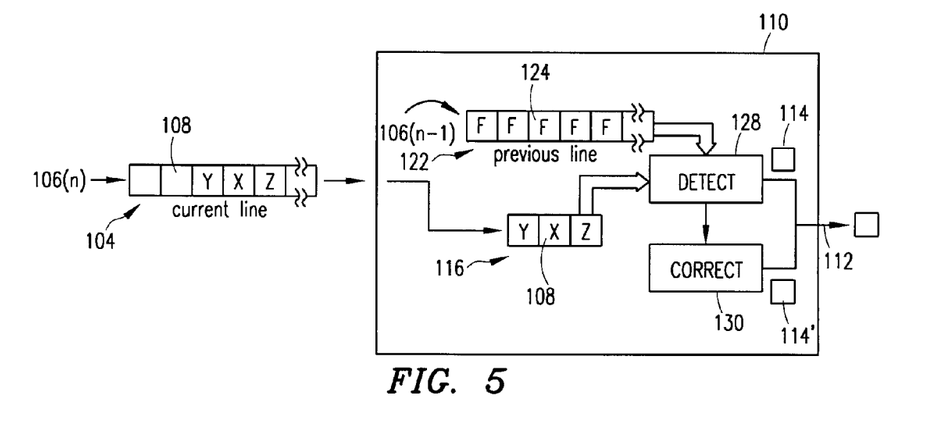
FIG. 5 is a block diagram illustrating an operation for bad pixel processing in accordance with an embodiment of the present invention.

FIG. 5 shows a block diagram illustrating an operation for bad pixel processing performed by processor 110 in accordance with an embodiment of the present invention. The bad pixel processor 110 processes the pixel data 108 captured by the buffer 104 for one line 106 (see, FIG. 4) one pixel at a time (generically referred to as pixel "X") in order to determine if each piece of pixel data under examination is generated by a bad pixel. To assist in the making of this determination, the processor 110 includes a data buffer 116 that stores the pixel data 108 (as currently captured in buffer 104) not only for pixel X under examination, but also for the pixels Y and Z that neighbor (e.g., are immediately adjacent to, or nearby on the same line 106 as) the pixel X in the currently read-out line 106(n). To further assist in the making of this determination, the processor 110 includes a feature buffer 122 storing a characteristic feature (F) 124 (to be described in more detail below) of each of the pixels in an adjacent previously read-out line 106(n−1).

Generally speaking, the characteristic feature 124 for a pixel differs significantly from the pixel data for a pixel in that the characteristic feature is not indicative of the magnitude of the incident light, but is rather indicative of some non-magnitude characteristic relating to the pixel. As an example, the characteristic feature 124 may comprise a bad pixel identification, an edge direction identification, line transition identification, and the like. Importantly, the characteristic feature for a pixel requires less memory per pixel than pixel data (see, buffer 32, FIG. 3), thus allowing the feature buffer 122 to have as small a size as possible.

A detection algorithm 128 processes both the pixel data 108 for pixels X, Y and Z in the currently read-out line as well as the characteristic features (F) 124 for the pixels in the previously read-out line 106(n−1) to determine whether pixel X is a bad pixel. It will be understood that the process performed by algorithm 128 may consider pixel data for other neighboring pixels, if desired. If the pixel is not bad, the pixel data 108 for pixel X is assumed to represent valid pixel data generated from a good pixel, and is output 112 in its original form 114. If pixel X is determined to be a bad pixel, a correction algorithm 130 is executed to modify the pixel data 108 into modified pixel data 114' that more accurately represents the intensity of the light that is incident on the photodetector. Any selected one of a number of well known operations for correcting pixel data from bad pixels may be used. No matter what correction operation is used, however, it is preferred that as much pixel data as possible, including the pixel data for pixels Y and Z (and perhaps other neighbors) in the current line 106(n) be considered in effectuating the correction. As a further enhancement to the invention, the correction operation may also consider the characteristic features (F) 124 for the pixels in the previous line 106(n−1), in effectuating the correction. Following correction, the modified data 114' for pixel X is passed to serial output 112.

Figure 6:
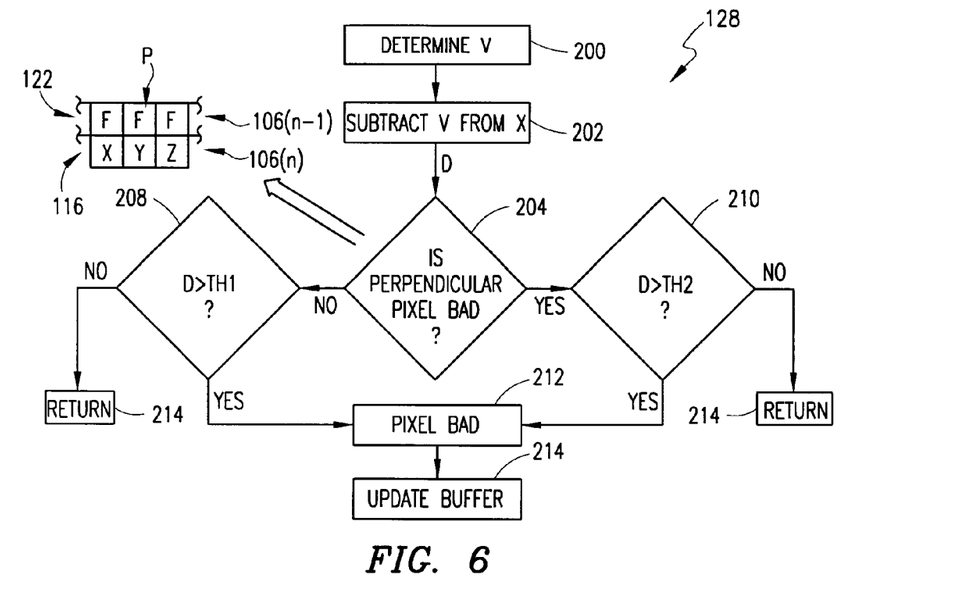
FIG. 6 is a flow diagram illustrating one embodiment of a process for bad pixel detection using the processing operation of FIG. 5.

FIG. 6 shows a flow diagram illustrating one embodiment of a process for bad pixel detection performed by the processor 110 of FIG. 5. In this embodiment for the pixels in the previous line 106(n−1), the bad/good pixel decisions previously made by the detection algorithm 128 are used as the characteristic features (F) 124 that are stored in the feature buffer 122. These characteristic features require only a binary (1/0) storage, i.e., only one bit per pixel. This serves to significantly reduce the size of the memory required for the feature buffer 122 in comparison to that required by the buffer 32 (FIG. 3) of the prior art. In step 200, the detection algorithm 128 uses the pixel data stored in the buffer 116 and calculates an average or median value (V) for the pixel data 108 of the pixels Y and Z that are adjacent the pixel X under examination (in the same line 106 (n) that is used as a reference value). It will be understood that the step 200 calculation may use pixel data for other neighbors in line 106(n).

The detection algorithm 128 then executes step 202 and processes the reference value (V) and the pixel data 108 for pixel X as stored in buffer 116. More specifically, this step 202 processing subtracts the value V from the data 108 value of pixel X to obtain a difference value (D). The detection algorithm 128 then uses the characteristic features (F) 124 stored in the feature buffer 122 and determines in step 204 whether a pixel (P) having the same relative position in the previous line 106(n−1) as the pixel X under examination in the current line 106(n) was previously detected as being a bad pixel. This pixel (P) is referred to herein as being a "perpendicularly adjacent" pixel. If NO, then the difference value (D) calculated in step 202 is compared against a first threshold (TH1) in step 208. More specifically, this step 208 comparison determines whether the magnitude of the difference value (D) exceeds the first threshold (TH1). If, on the other hand, the determination in step 204 is YES, then the difference value (D) calculated in step 202 is compared against a second, different, threshold (TH2) in step 210. More specifically, this step 210 comparison determines whether the magnitude of the difference value (D) exceeds the second threshold (TH2).

If the executed comparison operation of either steps 208 or 210 is satisfied (i.e., the appropriate threshold is exceeded), the detection algorithm 128 identifies the pixel X under examination as a "bad pixel" in step 212. This identification of the pixel X as a bad pixel is recorded in the feature buffer 122 in step 214. Operation with respect to pixel X then proceeds to the correction algorithm 130 to modify the pixel data 108 in accordance with a desired correction operation to produce modified pixel data 114' that more accurately represents the intensity of the light that is incident on the photodetector. If, on the other hand, the executed comparison operation of steps 208 or 210 is not satisfied, this indicates that the pixel is a "good pixel" data 108 for pixel X is assumed to represent valid pixel data generated from a good pixel for output 112 in its original form 114. The process then returns (step 214) to process a next pixel.

Although a specific implementation is shown for step 200 and 202 to obtain the difference value (D) for purposes of comparison to the thresholds TH1 or TH2, it will be understood that any suitable procedure may be used to obtain information that is indicative of a difference between the measured pixel X value (given by the pixel data) and a reference value.

The second threshold (TH2) is preferably set higher than the first threshold (TH1) (i.e., TH2>TH1). This makes it more difficult for the comparison operation of step 210 to be satisfied, and thus identify the pixel X that is under examination as a "bad pixel" when pixel X in line 106(n) is perpendicularly adjacent to previously detected bad pixel in line 106(n–1). One reason for this is that it is statistically unlikely that two adjacent bad pixels in consecutive lines 106 exist. Another reason for this is that while the prior art single threshold process of FIG. 2 accurately identifies bad pixels in most cases, it has an unwanted side effect of erroneously identifying good pixels as bad pixels. A domino effect thus occurs where one erroneous bad pixel detection propagates among a few adjacent pixels in subsequent lines. The dual threshold approach of FIG. 6 acts to reduce this unwanted side effect by increasing the threshold level that must be satisfied for bad pixel identification when the pixel under examination is perpendicularly adjacent a pixel previously identified as being a bad pixel.

Figure 7:
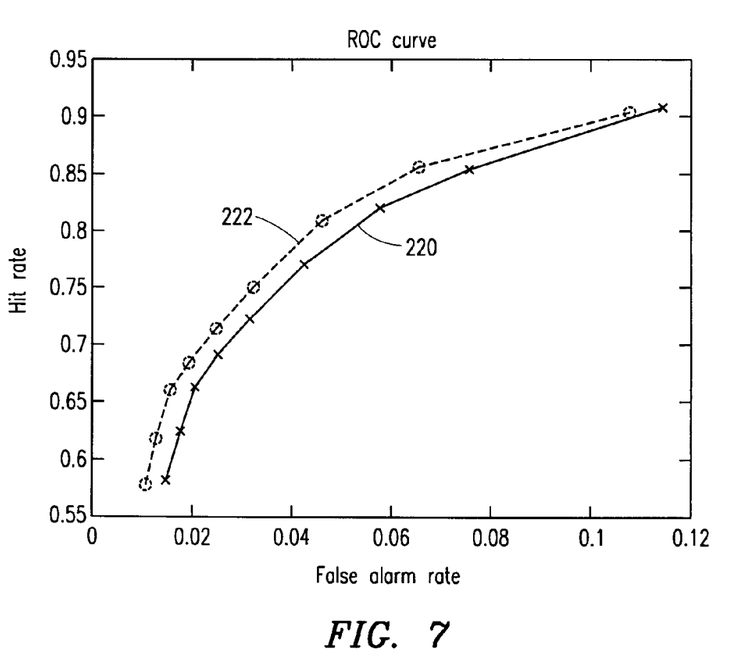
FIG. 7 is a receiver operating characteristics (ROC) graph illustrating an improvement in bad pixel detection operation performance using the process of FIG. 6.

The effectiveness of the process for bad pixel identification illustrated in FIG. 6 in reducing the unwanted side effect is graphically illustrated in FIG. 7, which shows a receiver operating characteristics (ROC) graph. The ROC graph plots the false alarm rate, which indicates the number good pixels being unnecessarily corrected (i.e., the unwanted side effect), against the hit rate, which indicates the number of bad pixels being accurately corrected. Curve 220 is a representative ROC curve for the single threshold process shown in FIG. 3, while curve 222 is a representative ROC curve for the dual threshold process shown in FIGS. 5 and 6. Any shifting of the ROC curve towards the upper left hand corner of the graph (i.e., toward a hit rate of 1 and a false alarm rate of 0) represents an improvement in performance. As shown in FIG. 7, the curve 222 is shifted in that direction relative to the curve 220. It is accordingly concluded that there is a significant benefit in improved performance by utilizing different thresholds for the step 208 and 210 comparisons. This is made possible through the use of the characteristic features (F) 124 as described. It is also noted that, because the characteristic features (F) 124 require storage of only a single bit per pixel, the size of the buffer 122 is significantly reduced and performance is improved.

In an embodiment of the process of FIG. 6, the second threshold (TH2) is set to be an integer multiple (n) of the first threshold (TH1) (i.e., TH2=nTH1). More specifically, and in conjunction with the representative ROC curves 220 and 222 shown in FIG. 7, the integer multiple is two (2). It will, of course, be understood that the multiple "n" need not necessarily comprise an integer value, and further that any suitable scaling factor could be used provided it produces improved performance as measured by its corresponding ROC curve. It will also be recognized that the multiple "n" may be variably set in other ways based on the stored characteristic feature data. As an example, in situations where the characteristic features record characteristics other than bad/good pixel, especially in situations where data has more than two possible values, a corresponding plurality of thresholds may be applied to give the detection determination a more robust response and perhaps better accuracy. For example, the characteristic feature may indicate whether the pixel has an associated edge direction (right edge, left edge, no edge smooth, no edge texture) in the overall image. In this scenario, it is possible for a different threshold to be associated with each edge direction. As another example, the characteristic feature may indicate whether the pixel has an associated line transition (peak, valley, ramp, flat) in the overall image. Similarly, in this scenario, as an example, it is possible for a different threshold to be associated with each line transition.

Figure 8:
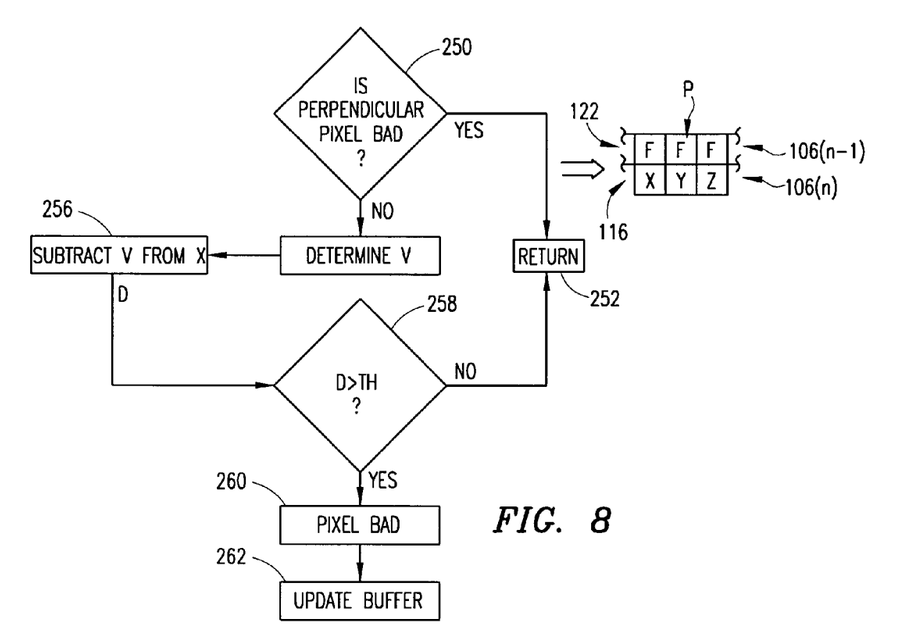
FIG. 8 is a flow diagram illustrating another embodiment of a process for bad pixel detection using the processing operation of FIG. 5.

FIG. 8 shows a flow diagram illustrating another embodiment of a process for bad pixel detection performed by the processor 110 of FIG. 5. In this embodiment, the bad/good pixel decisions previously made by the detection algorithm 128 for the pixels in the previous line 106(n–1) are used as the characteristic features (F) 124 for the pixels in the previous line 106(n–1) that are stored in the feature buffer 122. These characteristic features (F) 124 require only a binary (1/0) storage feature, i.e., one bit per pixel. This serves to significantly reduce the size of the memory required for the feature buffer 122 in comparison to that required by the buffer 32 (FIG. 3) of the prior art. In step 250, the detection algorithm 128 uses the characteristic features (F) 124 stored in the feature buffer 122 and determines whether a perpendicularly adjacent pixel (P) to the pixel X under examination was previously detected as being a bad pixel. If the determination in step 250 is YES, the process precludes a finding that pixel X could comprise a "bad pixel" and the pixel data 108 for pixel X is assumed to represent valid pixel data for output 112 in its original form 114. The process then returns (step 252) to process a next pixel. Put another way, if the process determines that the pixel (P) corresponding to pixel X a previous line 106(n–1) is a bad pixel (as indicated by the stored characteristic feature), then pixel X in a current line 106(n) is not permitted to be identified as a bad pixel.

If, on the other hand, the executed determination operation of step 250 is NO, the detection algorithm 128 uses the information stored in the buffer 116 and calculates (in step 254) an average or median value (V) for the pixel data 108 of the pixels Y and Z that are adjacent the pixel X under examination (in the same line 106(n)) as a reference value. It will be understood that the step 254 calculation may use pixel data for other neighbors in line 106(n). The detection algorithm 128 then executes step 256 and processes the reference value (V) and the pixel data 108 for pixel X as stored in buffer 116. More specifically, this step 256 processing subtracts the value V from the data 108 value of pixel X to obtain a difference value (D).

The difference value (D) calculated in step 256 is then compared against a threshold (TH) in step 258. More specifically, this step 258 comparison determines whether the magnitude of the difference value (D) exceeds the threshold (TH). If YES, the detection algorithm 128 identifies the pixel X under examination as a "bad pixel" in step 260. This identification of the pixel X as a bad pixel is recorded in the feature buffer in step 262. Operation with respect to pixel X then proceeds to the correction algorithm 130 to modify the pixel data 108 into modified pixel data 114' that more accurately represents the intensity of the light that is incident on the photodetector. If, on the other hand, the executed comparison operation of step 258 is not satisfied, this indicates that the pixel is a "good pixel" and the pixel data 108 for pixel X assumed to represent valid pixel data for output 112 in its original form 114. The process (step 252) then returns to process a next pixel.

Although a specific implementation is shown for step 254 and 256 to obtain the difference value (D) for purposes of comparison to the threshold TH, it will be understood that any suitable procedure may be used to obtain information that is indicative of a difference between the measured pixel X value (given by the pixel data) and a reference value.

Again, it will be understood that characteristic features other than bad/good pixel detection can be used to drive the preclusion determination of steps 250 and 252. As an example, when the characteristic features record characteristics other than bad/good pixel, especially in situations where data has more than two possible values, only certain one(s) of the specific features may drive a preclusion determination where some relationship between that feature and faulty bad pixel detection has been noted. For example, the characteristic feature may indicate whether the pixel has an associated edge direction (right edge, left edge, no edge smooth, no edge texture) in the overall image. In this scenario, as an example, it is possible for only the right/left edge direction to preclude bad pixel identification. As another example, the characteristic feature may indicate whether the pixel has an associated line transition (peak, valley, ramp, flat) in the overall image. Similarly, in this scenario, as an example, it is possible for only the ramp transition to preclude bad pixel identification.

Figure 9:
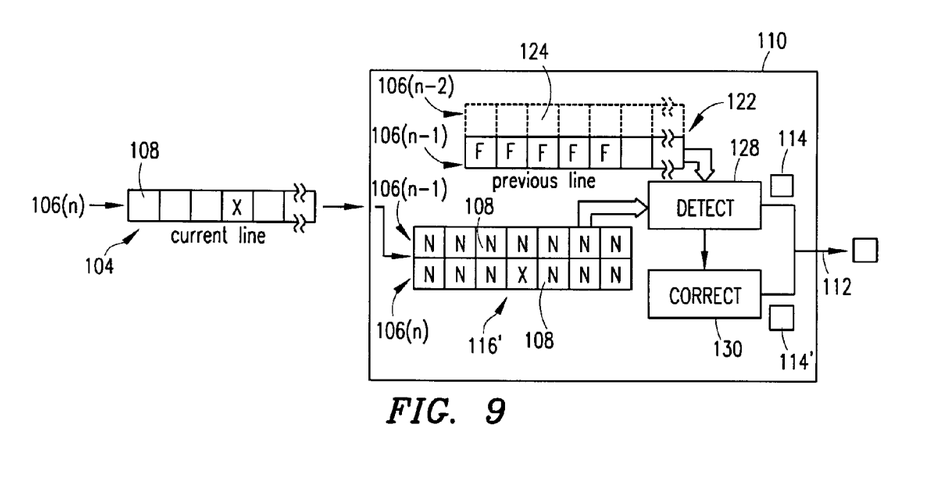
FIG. 9 is a block diagram illustrating another operation for bad pixel processing in accordance with an embodiment of the present invention.
Figure 10:
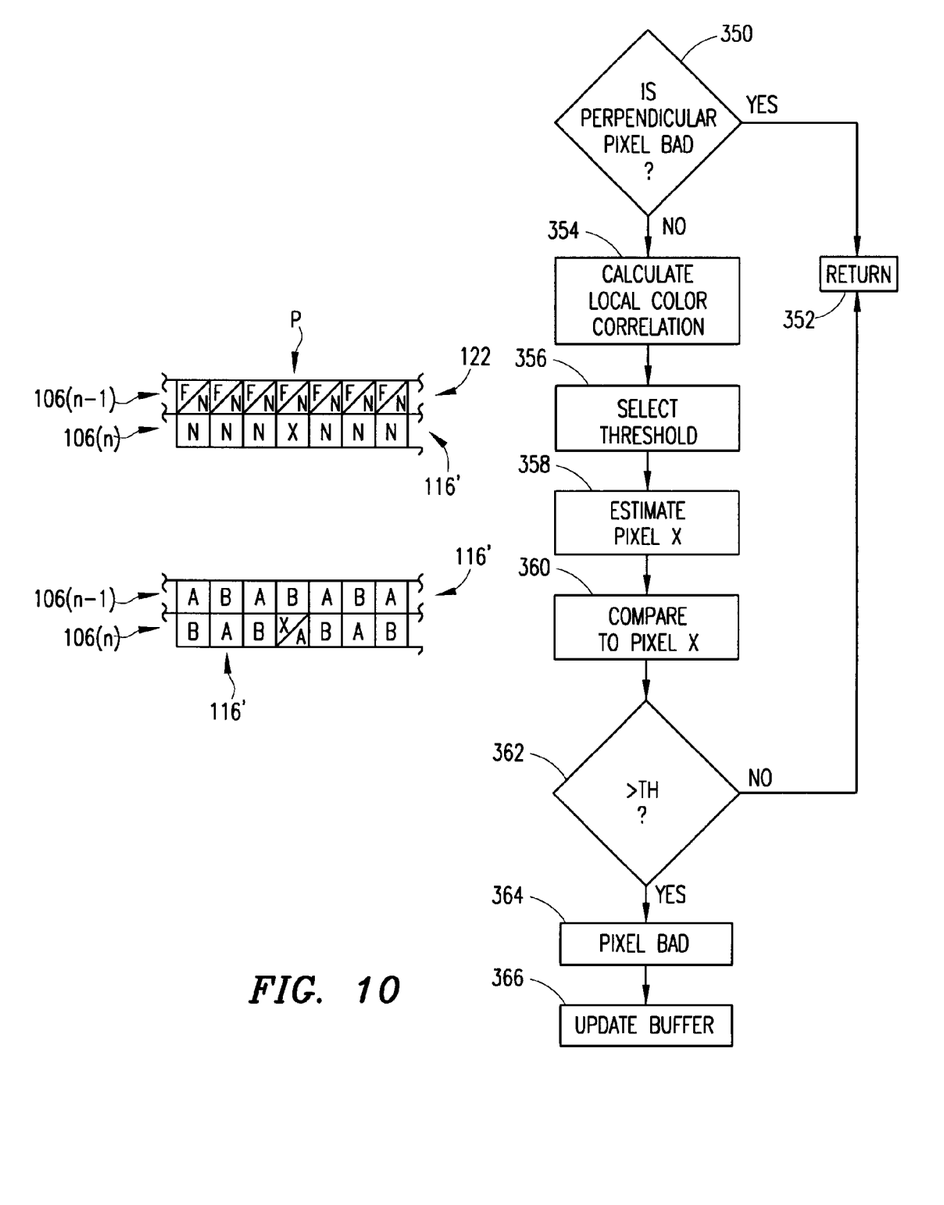
FIG. 10 is a flow diagram illustrating another embodiment of a process for bad pixel detection using the processing operation of FIG. 9.

FIG. 9 shows a block diagram illustrating another operation for bad pixel processing performed by the processor 110 in accordance with an embodiment of the present invention. The bad pixel processor 110 processes the pixel data 108 captured by the buffer 104 for one line 106 (see FIG. 4) one pixel at a time (generically referred to as pixel "X") in order to determine if each piece of pixel data under examination is generated by a bad pixel. To assist in the making of this determination, the processor 110 includes a two line data buffer 116' that stores the pixel data 108 (as currently captured in buffer 104) not only for pixel X under examination, but also for m neighboring pixels N that are located in the same line 106(n) as pixel X and in the previous line 106(n−1). In an embodiment, m is set equal to thirteen (as illustrated in FIG. 10), to store pixel data for six pixels in line 106(n) and seven pixels in line 106(n−1). It will be understood, however, that m can be set equal to any suitable integer value and any desired pieces of pixel data may be stored. To further assist in the making of this determination, the processor 110 includes a feature buffer 122 storing a characteristic feature (F) 124 (to be described in more detail below) of each of the pixels in an adjacent previously read-out line 106(n−1).

A detection algorithm 128 processes the pixel data 108 for pixel X and the pixels N as well as the characteristic features (F) 124 for the pixels in the previously read-out line 106 (n−1) to determine whether pixel X is a bad pixel. If not, the pixel data 108 for pixel X is assumed to represent valid pixel data generated from a good pixel, and is output 112 in its original form 114. If pixel X is determined to be a bad pixel, a correction algorithm 130 is executed to modify the pixel data 108 in accordance with a desired correction operation into modified pixel data 114' that more accurately represents the intensity of the light that is incident on the photodetector. Any selected one of a number of well known operations for correcting pixel data for bad pixels may be used. It is preferred, however, that whatever correction operation is used that as much data as possible, including the pixel data for pixels N in the current line 106(n) and previous line 106(n−1); be considered in effectuating the correction. As a further enhancement to the invention, the correction operation may also consider the characteristic features (F) 124 for the pixels in the previous line 106(n−1) in effectuating the correction. Following correction, the modified pixel data 114' for pixel X is passed to serial output 112.

FIG. 10 shows a flow diagram illustrating one embodiment of a process for bad pixel detection performed by the processor 110 of FIG. 9. In this embodiment, the bad/good pixel decisions previously made by the detection algorithm 128 for the pixels in the previous line 106(n−1) are used as the characteristic features (F) 124 stored in the feature buffer 122. These characteristic features (F) 124 require only a binary (1/0) storage, i.e., one bit per pixel. This serves to significantly reduce the size of the memory required for the feature buffer 122 in comparison to that required by the buffer 32 (FIG. 3) of the prior art. In step 350, the detection algorithm 128 uses the characteristic features (F) 124 stored in the feature buffer 122 and determines whether a perpendicularly adjacent pixel (P) to the pixel X under examination was previously detected as being a bad pixel. If the determination in step 350 is YES, the process precludes a finding that pixel X could be a "bad pixel" and the pixel data 108 for pixel X is assumed to represent valid pixel data for output 112 in its original form 114. The process then returns (step 352) to process a next pixel. Put another way, if the process determines that the pixel (P) in a previous line 106(n−1) that corresponds in position to pixel X is a bad pixel (as indicated by the stored characteristic feature), then the pixel X in the current line 106(n) is not permitted to be identified as a bad pixel.

If, on the other hand, the executed determination operation of step 350 is NO, the detection algorithm 128 uses the pixel data stored in the buffer 116' and calculates (in step 354) local color correlation for the pixels X and N. From this determined color correlation, the algorithm 128 selects a threshold (TH) for bad pixel detection in step 356. In this regard, it is noted that bad pixels tend to have a different color from neighboring pixels. For areas under examination where there is a high color correlation among the pixels N, identification of pixel X as a bad pixel can be accurately determined by color correlating to the neighboring pixels. Thus, the threshold (TH) for the comparison to pixel X is set relatively low. For areas, on the other hand, having a low correlation among the pixels N, it is more difficult to distinguish a bad pixel from an image feature using a comparison. Thus, the threshold (TH) for that comparison to pixel X is set relatively high.

More specifically, the local color correlation process of step 354 involves splitting the pixels X and N in the buffer 116' into two types (for example, A and B, as shown in FIG. 10 with an "odd/even" arrangement). Next, a calculation of a local variance (Var) and covariance (Cov) of the two pixel types is made for each line 106(n) and 106(n−1) saved in the buffer 116'. The calculation may be made, for example, in accordance with the following:

$$Var(A)=E(A^2)-E(A)^2$$

$$Var(B)=E(B^2)-E(B)^2$$

$$Cov(A,B)=E(AB)-E(A)E(B);$$

wherein E( ) is defined as the mean or average value. With respect to step 356, a conditional variance is calculated as follows:

$$Var(A|B)=Var(A)-Cov(A,B)^2/Var(B).$$

The conditional variance measures the certainty of an estimate of the value of pixel X (see, the E(A|B) calculation below) given the values of the neighboring pixels. If the certainty is low, this would indicate that the threshold for comparison should be set relatively high, and vice versa. The standard deviation (S) of the conditional variance is then determined by taking the square root of the conditional variance in a well known manner. The threshold (TH) is then set to a value equal to n (generally a non-negative integer, or other suitable scaling factor) times the standard deviation as follows:

$$TH=n*S.$$

The value of the threshold (TH) is accordingly set as a function of the determined conditional variance that measures certainty with respect to pixel X estimation.

The foregoing may be better understood by reference to some examples. In a first case in which the image comprises flat areas having a high color correlation, the determined variance (Var) is low, the determined covariance (Cov) is low, and the determined conditional variance is also low. The resulting standard deviation is also low and the threshold is set to a relatively low value because bad pixels can relatively easily be identified in such an image having high color correlation. In a second case in which the image comprises edges and/or textures having some color correlation, the determined variance is high, the determined covariance is high, and the determined conditional variance is relatively low. The resulting standard deviation is medium and the threshold is set to a medium value because bad pixels in some image cases can be difficult to identify. In a third case in which the image comprises random noise having little color correlation, the determined variance is high, the determined covariance is low, and the determined conditional variance is high. The resulting standard deviation is high and the threshold is set to a relatively high value because bad pixels are very difficult to identify in such low color correlation images.

The algorithm next executes step 358 and calculates an estimate of pixel X from the values of the same line 106(n), adjacent pixels. More specifically, the value of pixel X is estimated from its left and right neighbors in line 106(n) as follows:

$$E(A|B)=E(A)+(Cov(A,B)/Var(B))*(B-E(B)).$$

It should be remembered that the conditional variance determination referenced above measures a level of confidence in this estimation that is used to determine the threshold (TH) to be applied. Next, in step 360, the algorithm processes the pixel data 108 for pixel X as stored in buffer 116' and estimate determined in the step 358. More specifically, this step 360 processing subtracts the step 358 estimate from the data 108 value of pixel X to obtain a difference value (D) in accordance with the following:

$$D=X-E(A|B).$$

The difference value (D) calculated in step 360 is then compared in step 362 against the determined threshold (TH). More specifically, this step 362 comparison determines whether the magnitude of the difference value (D) exceeds the threshold (TH). If YES, the detection algorithm 128 identifies the pixel X under examination as a "bad pixel" in step 364. This identification of pixel X as a bad pixel is recorded in the feature buffer 122 in step 366. Operation with respect to pixel X then proceeds to the correction algorithm 130 to modify the pixel data 108 into modified pixel data 114' that more accurately represents the intensity of the light that is incident on the photodetector. If, on the other hand, the executed comparison operation of step 362 is not satisfied, this indicates that the pixel is a "good pixel" and the pixel data 108 for pixel X assumed to represent valid (i.e., good) pixel data for output 112 in its original form 114. The process then returns (step 352) to process a next pixel.

The threshold (TH) varies with the calculated conditional variance in order to make it more difficult for the comparison operation of step 362 to be satisfied and identify the pixel X as a "bad pixel" when pixel X in line 106(n) is located in area of the image having a low color correlation. Notwithstanding the enhanced accuracy in bad pixel detection that is provided by using such a variable image correlation based threshold value as illustrated in FIG. 10, the local color correlation process by itself may produce an unwanted side effect of vertically propagating false bad pixel identifications which result in the elimination of photodetector pixel data 108 in vertical lines of the image. The use of the characteristic features (F) 124, and more particularly the process of step 350 to force an exit from the bad pixel detection algorithm when a perpendicularly adjacent pixel in a previous line 106(n−1) is identified as a bad pixel, acts to reduce this unwanted side effect by preventing false bad pixel identifications from propagating vertically.

Figure 11:
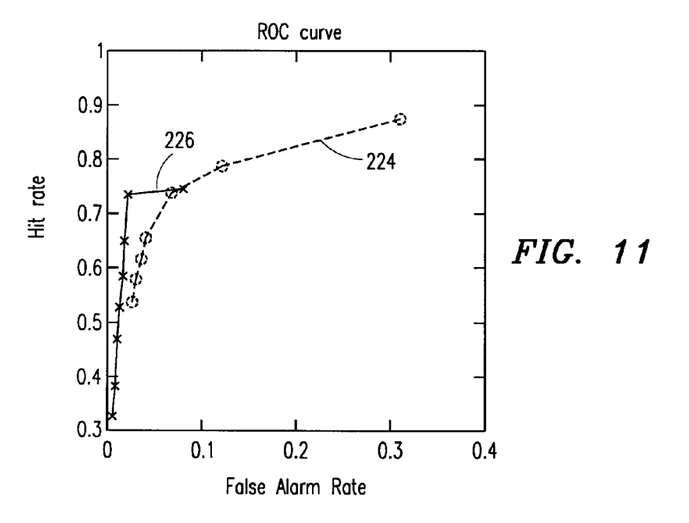
FIG. 11 is an ROC graph illustrating an improvement in bad pixel detection operation performance using the process of FIG. 10.

The effectiveness of the process for bad pixel identification illustrated in FIG. 10 in reducing the unwanted side effect is graphically illustrated in FIG. 11, which shows a receiver operating characteristics (ROC) graph. The ROC graph plots the false alarm rate which indicates the number good pixels being inadvertently corrected (i.e., the unwanted side effect), against the hit rate, which indicates the number of bad pixels being accurately corrected. Curve 224 is a representative ROC curve for the process in which only local color correlation is used to identify bad pixels, while curve 226 is a representative ROC curve for the process shown in FIG. 10. Any shifting of the ROC curve towards the upper left hand corner of the graph (i.e., toward a hit rate of 1 and a false alarm rate of 0) represents an improvement in performance. As shown in FIG. 11, the curve 226 is shifted in that direction relative to the curve 224. It is accordingly concluded that there is a significant benefit in improved performance by applying the perpendicularly adjacent characteristic feature (F) 124 test. It is also noted that, because the characteristic features (F) 124 require storage of only a single bit per pixel, the size of the buffer 122 is significantly reduced and improved performance is obtained.

While the present invention as disclosed is preferably implemented using CMOS technology with all (or substantially all) components and functionalities implemented on a single integrated circuit chip, it will be understood that other semiconductor fabrication techniques could be used, and further that components and functionalities may be split among and between multiple chips and/or devices.

The processing operations of the disclosed methods concerning the detection and correction algorithms are preferably implemented using microprocessor or application specific integrated circuit (ASIC) techniques. It will, of course, be understood that separate processing devices may be interconnected in certain applications to the sensor array.

It should also be recognized that the methods, systems and processes described herein are equally useful in connection with both color and black/white sensors.

The threshold values described herein may be changed and set in any of a number of ways depending on where a user desires to set operation with respect to the ROC curve. As an example, the device may be manufactured as a chip with settable values, and further include an input mechanism to allow the user preferentially change the set values.

With respect to the implementations of FIGS. 5 and 9, it will be understood by those skilled in the art that some instances may arise where the detection/correction functionalities (references 128 and 130) are not desired. In these instances, the functionalities 128 and 130 may be selectively by-passed under user control to allow the raw output data from the buffer 104 to pass straight through for more sophisticated processing.

The feature buffer 122 is disclosed as saving the characteristic features (F) for the pixels of a single preceding line 106($n$−1). While this is an embodiment, it will be recognized that the feature buffer 122 may include sufficient memory to store characteristic features for the pixels of plural preceding lines (for example, 106($n$−1) and 106($n$−2), as shown in phantom in FIG. 9). Furthermore, it will be recognized that different characteristic features may be stored by the buffer for the pixels of different lines. As one example, the multi-line feature buffer 122 may store characteristic features comprising bad pixel identifications for the past two lines 106($n$−1) and 106($n$−2). As another example, the characteristic features stored by the multi-line feature buffer 122 for the immediately previous line 106($n$−1) may include not only bad pixel identification, but also some other characteristic features, while the next previous line 106($n$−2) includes only the bad pixel identification data. When storing additional previous line's worth of characteristic features (i.e., features for lines beyond line 106($n$−1)), these additional features can be included and considered in the evaluations performed by the detection algorithm 128. An advantage provided by such storage would include improvement in algorithm performance for catching "corner cases" with only a minimal increase in the amount of required data storage for the feature buffer 122.

It is recognized that the feature buffer 122 is used to save on computation. For example, consider the case where both current and previous line pixel data is stored along with the characteristic features for the pixels of those lines. Theoretically speaking, the stored previous line values could be used to generate the characteristic features. However, these computations are, generally speaking, similar to, if not identical to, those computations that performed in connection with the processing of the current line values to identify bad pixels. Accordingly, when scanning and processing the values for the current line, the bad pixel identifications are determined and stored in the feature buffer thus obviating the need to store previous line pixel data and perform the computations again.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the invention as set forth and defined by the following claims.

We claim:

1. A sensor, comprising:
   an array of photodetectors, each photodetector generating pixel data indicative of incident light thereon; and
   a bad pixel processor including:
      a first buffer storing pixel data for a certain pixel in a current line of the array and pixel data for pixels adjacent to and, at least, on the same line as the certain pixel, the pixel data representing a magnitude of incident light;
      a second buffer storing a characteristic feature for each of the pixels in a line of the array previous to the current line, the characteristic feature being a non-magnitude characteristic, said non-magnitude characteristic being at least one of an edge direction identification, a line transition identification, and a bad pixel identification; and
      a detector that processes the pixel data stored in the first buffer and the characteristic features stored in the second buffer to identify whether the certain pixel in the current line is a bad pixel.

2. The sensor as in claim 1 wherein the characteristic feature consists of data identifying exclusively whether the pixel in the previous line was identified as a bad pixel.

3. The sensor as in claim 1 wherein the detector, in processing the characteristic features stored in the second buffer, precludes identification of the certain pixel in the current line as a bad pixel when the characteristic feature for an adjacent pixel in the previous line and adjacent to the certain pixel identifies the adjacent pixel as being a bad pixel.

4. The sensor as in claim 1 wherein the characteristic feature is indicative of a characteristic of a pixel in the previous line that is not related to incident light.

5. The sensor as in claim 1 wherein the first buffer further stores pixel data for pixels in the previous line.

6. The sensor as in claim 1, further including:
   a corrector that processes the pixel data stored in the first buffer to determine corrected pixel data for the certain pixel if the detector identifies the certain pixel as a bad pixel.

7. The sensor as in claim 6 wherein the determined corrected pixel data comprises pixel data stored in the first buffer for at least one pixel adjacent to the certain pixel in the current read out line.

8. The sensor as in claim 6 wherein the determined corrected pixel data comprises an average or median of the pixel data stored in the first buffer for the pixel(s) adjacent to the certain pixel.

9. The sensor as in claim 1 wherein the detector processes the pixel data from the first buffer to determine a difference value that is indicative of a difference between the pixel data for the certain pixel and a reference pixel value.

10. The sensor as in claim 9 wherein the reference pixel value comprises an average or median of the pixel data stored in the first buffer for the pixels adjacent to the certain pixel in the current line.

11. The sensor as in claim 9 wherein the detector compares the difference value to a first threshold value when the characteristic feature of an adjacent pixel indicates that the adjacent pixel is a not a bad pixel, and compares the difference value to a second threshold value greater than the first threshold value when the characteristic feature of the adjacent pixel indicates that the adjacent pixel is a bad pixel, the adjacent pixel being a pixel in the previous line and adjacent to the certain pixel.

12. The sensor as in claim 11 wherein the detector identifies the certain pixel in the current line as a bad pixel when either of the comparisons indicates the difference value to exceed the first/second threshold.

13. A method for processing pixel data that is indicative of incident light that is output from pixels in a photodetector array, comprising:
   storing pixel data for a certain pixel in a current line of the array and pixel data for pixels adjacent to the certain pixel, the pixel data comprising a magnitude of the incident light;
   storing a characteristic feature for each of the pixels in a line of the array previous to the current line, the characteristic feature comprising non-magnitude information; said non-magnitude information being at least one of an edge direction identification, a line transition identification, and a bad pixel identification; and
   processing the stored pixel data and the stored characteristic features to identify whether the certain pixel in the current line is a bad pixel.

14. The method as in claim 13 wherein processing comprises precluding identification of the certain pixel in the current line as a bad pixel when the characteristic feature for a pixel in the previous line and adjacent to the certain pixel in the current line identifies the adjacent pixel as being a bad pixel.

15. The method as in claim 13 wherein the characteristic feature is indicative of a characteristic of the pixel in the previous line that is not related to incident light.

16. The method as in claim 13 wherein storing pixel data further includes storing pixel data for pixels in the previous line.

17. The method as in claim 13, further including:
    processing the pixel data stored in a first buffer to determine corrected pixel data for the certain pixel if the detector identifies the certain pixel as a bad pixel.

18. The method as in claim 17 wherein processing comprises replacing the pixel data for the certain pixel with the pixel data for at least one of the pixels adjacent to the certain pixel in the current line.

19. The method as in claim 18 wherein processing comprises replacing the pixel data for the certain pixel with an average or median of the pixel data for the pixels adjacent to the certain pixel.

20. The method as in claim 13 wherein the characteristic feature consists of data identifying exclusively whether the pixel in the previous line was identified as a bad pixel.

21. The method as in claim 20 wherein processing comprises determining a difference value that is indicative of a difference between the pixel data for the certain pixel and a reference pixel value.

22. The method as in claim 21 wherein the reference pixel value comprises an average or median of the pixel data stored in the first buffer for the pixels adjacent to the certain pixel in the same current line.

23. The method as in claim 21 wherein processing further includes:
    determining whether the characteristic feature for a pixel in the previous line that is adjacent to the certain pixel in the current line identifies the adjacent pixel as being a bad pixel; and
    comparing the difference value to a threshold value;
    wherein the threshold is a first threshold value if the adjacent pixel is a not a bad pixel, and is a second threshold value, that is greater than the first threshold value, when the adjacent pixel is a bad pixel.

24. The method as in claim 23 wherein processing further includes identifying the certain pixel as a bad pixel when the comparing indicates that the difference value exceeds the threshold.

* * * * *